US006314873B1

(12) United States Patent
Lee et al.

(10) Patent No.: US 6,314,873 B1
(45) Date of Patent: Nov. 13, 2001

(54) THERMAL PRESSES FOR FORMING ARTICLES FROM A WEB OF THERMOPLASTIC MATERIAL AND METHODS OF OPERATING THERMAL PRESSES

(76) Inventors: Myron G. Lee, 2402 Barge St., Yakima, WA (US) 98902; Edward A. Nagy, 1 Avocete Dr., #205, Redwood City, CA (US) 94065-1768

( * ) Notice: Subject to any disclaimer, the term of this patent is extended or adjusted under 35 U.S.C. 154(b) by 0 days.

(21) Appl. No.: 09/643,095

(22) Filed: Aug. 21, 2000

Related U.S. Application Data

(62) Division of application No. 09/224,563, filed on Dec. 30, 1998, now Pat. No. 6,142,763.

(51) Int. Cl.[7] ............................................. B30B 13/00
(52) U.S. Cl. ........................... 100/35; 100/282; 100/264; 425/398
(58) Field of Search .................... 100/254, 260, 100/263, 264, 266, 282, 292, 35; 425/387.1, 398

(56) References Cited

U.S. PATENT DOCUMENTS

| | | | |
|---|---|---|---|
| 4,105,386 | * | 8/1978 | Thiel et al. ...................... 425/387.1 |
| 4,376,744 | | 3/1983 | DeSantis . |
| 4,489,021 | | 12/1984 | Antal et al. . |
| 4,755,128 | * | 7/1988 | Alexander et al. ................ 425/520 |
| 4,878,826 | * | 11/1989 | Wendt .............................. 425/387.1 |
| 5,238,389 | | 8/1993 | Brandau et al. . |
| 5,350,291 | | 9/1994 | Kitajima . |
| 5,505,611 | | 4/1996 | Aaseth et al. . |
| 5,513,977 | | 5/1996 | Kitajima . |
| 5,687,645 | * | 11/1997 | Kato .................................. 100/282 |
| 5,773,540 | * | 6/1998 | Irwin et al. ...................... 425/387.1 |
| 5,832,816 | * | 11/1998 | Seto et al. ........................... 100/282 |
| 6,067,886 | * | 5/2000 | Irwin ................................. 100/282 |

FOREIGN PATENT DOCUMENTS 59 91019    11/1982   (JP).

* cited by examiner

Primary Examiner—Peter Vo
Assistant Examiner—Louis K. Huynh
(74) Attorney, Agent, or Firm—Stratton Ballew PLLC

(57) ABSTRACT

Thermal presses and methods for operating thermal presses in the fabrication of finished articles from a web of thermoplastic material. In one embodiment, a thermal press includes a primary frame, a drive shaft rotatably attached to the frame, and a first arm projecting away from the drive shaft. The drive shaft can extend from one side of the frame to another to rotate about its longitudinal axis, and the drive shaft can have a load area spaced apart from the primary frame. The first arm projects from the drive shaft at the load area, and the first arm is connected to the drive shaft to rotate with the drive shaft. The first arm includes a connecting point configured to pivotally attach the first arm to a second link that is rotatably attached to a first forming assembly. The rotation of the drive shaft rotates the first arm and the second link to move the first forming assembly along a travel path between an engage position and a disengage position. In the engage position, the first forming assembly presses the web against a second forming assembly to deform a portion of the web. As the first and second assemblies press against the web, a load force is exerted at the load area on the drive shaft. In a disengaged position, the first and second forming assemblies are spaced apart from the web. The thermal press also includes a counter-force assembly that can have a counteracting element and a support element. When the drive shaft rotates the first arm to position the first forming assembly in the engaged position, the counteracting element is configured to engage the support element and the first arm and/or the drive shaft at the load area to exert a counteracting force at the load area that opposes the load force.

4 Claims, 7 Drawing Sheets

THERMAL PRESSES FOR FORMING ARTICLES FROM A WEB OF THERMOPLASTIC MATERIAL AND METHODS OF OPERATING THERMAL PRESSES

This is a divisional of commonly signed U.S. patent application Ser. No. 09/224,563, filed Dec. 30, 1998, now U.S. Pat. No. 6,142,763.

TECHNICAL FIELD

The present invention relates to thermal presses and methods for fabricating plastic articles from a web of thermoplastic material. More particularly, the present invention relates to a drive assembly and methods for moving a platen in thermal presses.

BACKGROUND OF THE INVENTION

Thermal presses often form a web of thermoplastic material into yogurt cups, drinking cups, and other types of plastic articles. FIG. 1 is a schematic illustration of a system for forming a continuous web of a thermoplastic material and fabricating finished articles from the web. At the beginning of the process, finely divided pieces of the thermoplastic material are transferred from a bin 20 through an extruder 22, a polishing roll assembly 24, and a rubber roll assembly 25 to transform the finely divided pieces into a continuous web of the thermoplastic material. The web, for example, is generally a continuous sheet having a width of approximately 2–6 feet and a thickness of approximately 0.005 to 0.500 inches. The web moves from the roll assemblies 24 and 25 to a heat tunnel 26 that heats the web to a point at which the material can be physically deformed and still retain a desired shape. The web then moves from the heat tunnel 26 to a thermal press 28.

The thermal press 28 generally uses two complementary molds, such as a plug and a die, to form a section of the web into the finished article. typical thermal press has a plug platen, a platen drive assembly to raise and lower the plug platen, and a plug assembly attached to the plug platen. The plug assembly typically includes a separate final-drive motor coupled to the plug to move the plug along a drive axis independently from the movement of the platen, and the plug assembly may also include a press plate having an opening aligned with the plug to allow the plug to pass through the press plate. The thermal press also generally includes a separate die platen coupled to the platen drive assembly.

The thermal press 28 drives the plug into the die to form the finished article from the web. In operation, the plug and die assemblies are initially positioned on opposite sides of the web. The platen drive assembly drives the plug platen and die platen toward one another until the press plates press against opposing sides of the web. The final-drive mechanism then drives the plug through the opening in the press plate and into the web. As the plug travels into the die, the web stretches to conform to the shape of the plug and die. A vacuum is also typically drawn in the die and pressurized "form air" is typically blown from the plug to more accurately shape a portion of the web to conform to the shape of the plug and die. After the web is formed into the finished article, a positive air pressure passes through the plug to separate the finished article from the plug. The finished article is then cooled to a point at which it will retain its shape. In a typical application, several plugs are coupled to the final-drive motor and several dies are aligned with the plugs such that a plurality of plugs simultaneously pass into a corresponding plurality of dies to form a plurality of finished articles.

One manufacturing concern related to thermal presses is that the rim of the finished articles may not be formed accurately. The rim of a finished article is formed by the press plates as the platen drive assembly presses the press plates against opposing sides of the web. Conventional thermal presses, however, may not consistently apply the necessary pressure to shape the thermoplastic web in the rim region of the finished articles. As a result, one problem with conventional thermal presses is that they may not consistently produce rims having the desired wall thickness or shape.

Another manufacturing concern of fabricating articles from thermoplastic materials is that the walls of the finished articles may not be formed accurately. For example, the wall thickness of the finished articles may not be uniform or within a desired range. The wall thickness of a finished article is a function of many factors, including the consistency of the vacuum drawn in the dies and the form air from the plugs. If the vacuum in a die or the pressure of the form air is not sufficient, the wall thickness or the shape of the finished article may not accurately conform to the shape of the die. Many conventional thermal presses may not provide a consistent vacuum in the dies or sufficient form air pressure from the plugs because leaks may form between the press plates and the web at the rim of a finished article. Such leaking at the rim is particularly problematic when the press plates do not apply sufficient pressure against the web. Therefore, many conventional thermal presses may not accurately form the walls and the rims of the finished articles.

SUMMARY OF THE INVENTION

The present invention is directed toward thermal presses and methods for forming a portion of a thermoplastic web into a finished article. In one embodiment, a thermal press includes a primary frame, a drive shaft rotatably attached to the frame, and a first arm projecting away from the drive shaft. The drive shaft can extend from one side of the frame to another to rotate about its longitudinal axis, and the drive shaft can have a load area spaced apart from the primary frame. The first arm projects from the drive shaft at the load area, and the first arm is connected to the drive shaft to rotate with the drive shaft. The first arm includes a connecting point configured to pivotally attach the first arm to a second link that is rotatably attached to a first forming assembly. The rotation of the drive shaft rotates the first arm and the second link to move the first forming assembly along a travel path between an engaged position and a disengaged position. In the engaged position, the first forming assembly presses the web against a second forming assembly to shape a portion of the web and form the rim of the finished article. As the first and second forming assemblies press against the web, a load force is exerted at the load area on the drive shaft. In the disengaged position, the first and second forming assemblies are spaced apart from the web.

The thermal press also includes a counter-force assembly that can have a counteracting element and a support element. When the drive shaft rotates the first arm to position the first forming assembly in the engaged position, one embodiment of the counteracting element is configured to engage the support element and act either directly or indirectly against the first arm and/or the drive shaft at the load area. The counteracting element and the support element act together to exert a counteracting force at the load area that opposes the load force when the first and second forming assemblies press against the web. In several embodiments of the invention, the counter-force assembly accordingly inhibits or prevents deflection of the drive shaft under the load force. Thermal press, therefore, can consistently apply sufficient force against the web between the first and second forming assemblies to accurately form a rim and a wall of a finished article.

In one particular embodiment, the counteracting element is a second arm having a first section at the load area on the drive shaft and a second section projecting away from the drive shaft opposite from the first arm. The first and second arms of this embodiment define a first link. In one aspect of this embodiment, the first and second arms are integral components of the first link. In an alternative aspect of this embodiment, the first and second arms are separate components that are attached to one another proximate to the drive shaft at the load area. Additionally, the support element can be a flange or block having a surface aligned with the second section of the second arm and spaced apart from the drive shaft to engage the second section of the second arm when the first forming assembly enters the engaged position. Thus, as the first forming assembly enters the engaged position, the second section of the second arm engages the support element to exert the counteracting force against the drive shaft.

The counteracting element and support element can also include other embodiments. For example, the counteracting element can be a separate arm, cam or other member that engages the drive shaft and/or the first arm at the load area as the drive shaft rotates the first arm to position the first forming assembly in the engaged position. The counteracting element can alternatively be a cam projecting from the drive shaft such that the cam engages the support element when the drive shaft rotates the first arm to position the first forming assembly in the engaged position.

DETAILED DESCRIPTION OF THE INVENTION

The present invention is generally directed toward thermal presses to fabricate finished articles from a web of thermoplastic material. Many specific details of certain embodiments of the invention are set forth in the following description and in FIGS. 2–7 to provide a thorough understanding of such embodiments. One skilled in the art, however, will understand that the present invention may have additional embodiments, or that the invention may be practiced without several of the details described in the following description.

Figure 1:
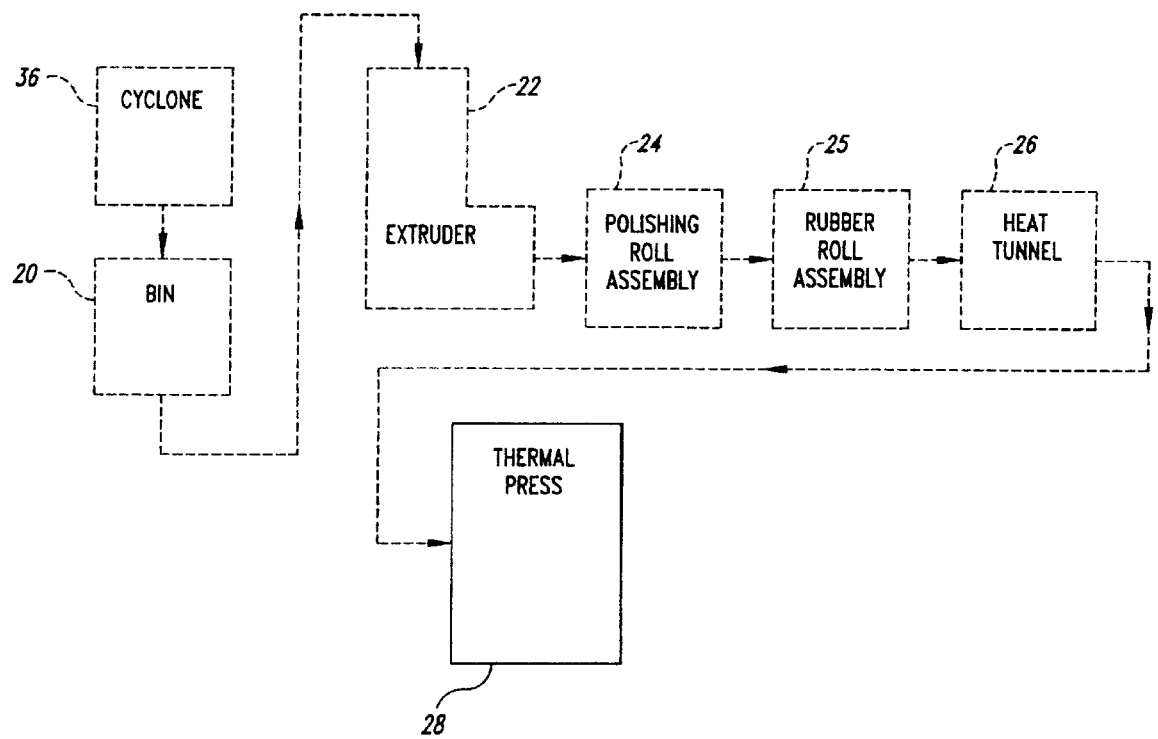
FIG. 1 is a schematic view of a system for forming a finished article from a web of thermoplastic material.
Figure 2:
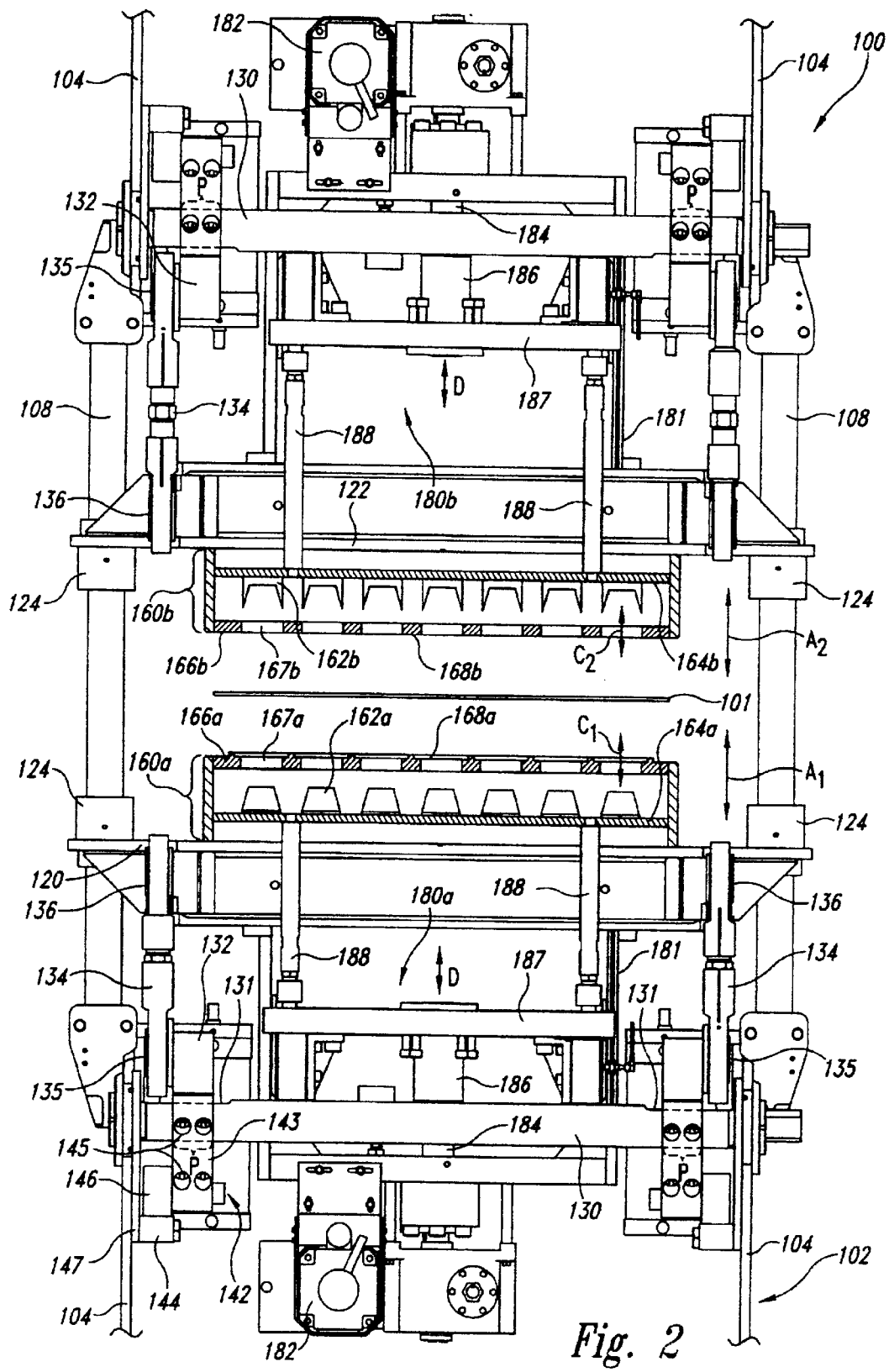
FIG. 2 is a front elevation view illustrating a portion of a thermal press in accordance with an embodiment of the invention.
Figure 3:
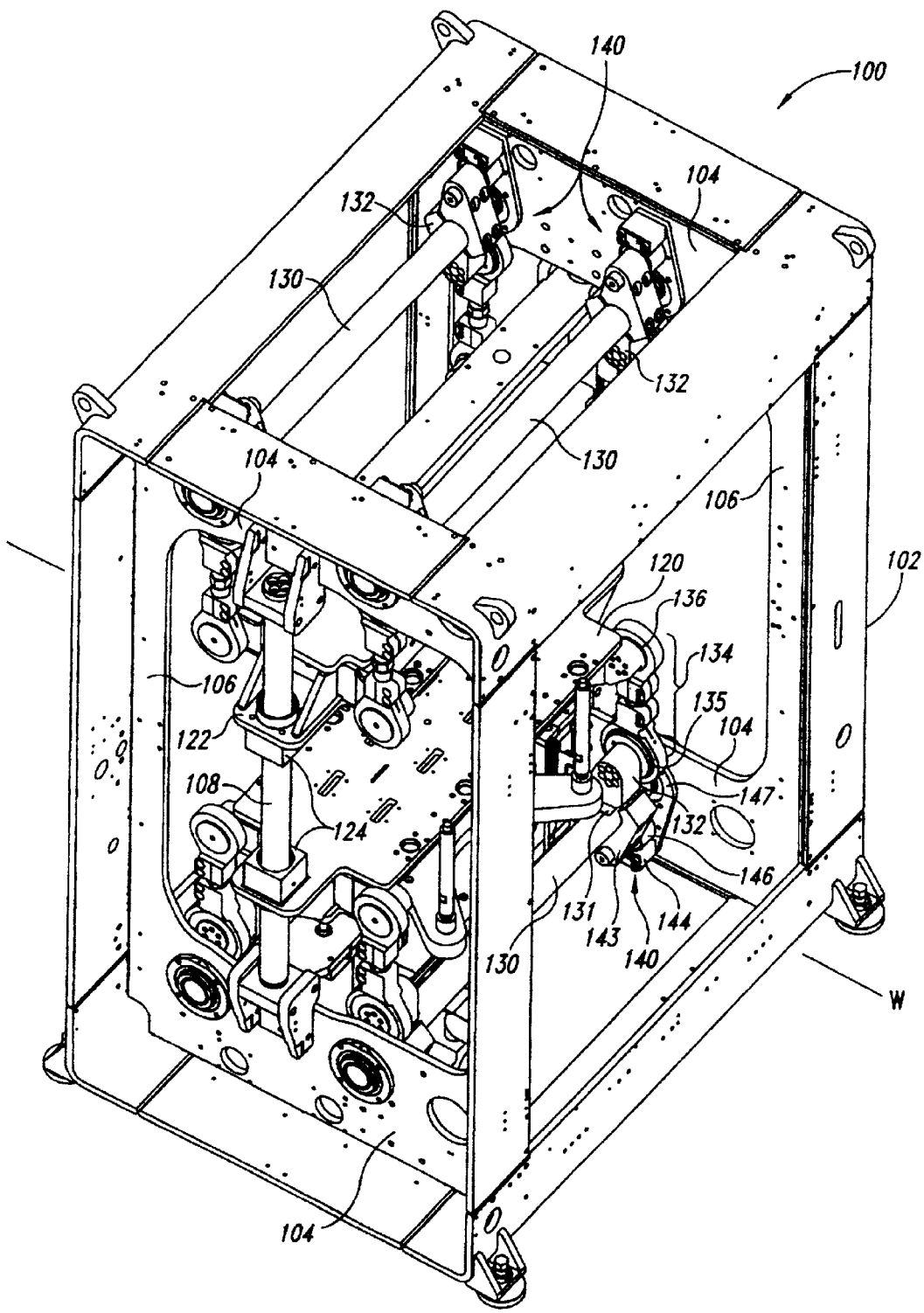
FIG. 3 is a top isometric view illustrating a portion of the thermal press of FIG. 2.

FIGS. 2 and 3 illustrate a thermal press 100 in accordance with one embodiment of the invention for forming finished articles from a web 101 (FIG. 2) of thermoplastic material. The thermal press 100 includes a primary frame 102 having a plurality of cross members 104 extending between vertical members 106. The primary frame 102 of the thermal press 100 can also include guide rails 108 extending between upper and lower cross members 104 on the same side of the primary frame 102. The web 101 enters the thermal press 100 from a heat tunnel so that the web is heated to a desired temperature for thermoplastic shaping in the thermal press 100. The web 101 moves through the thermal press 100 along a web path W (FIG. 3).

The thermal press 100 can also include a first platen 120 on one side of the web 101 and a second platen 122 on an opposite side of the web 101. The first and second platens 120 and 122 are slideably coupled to the guide rails 108 by bushings 124. The first platen 120 carries a first forming assembly 160a and a final-drive assembly 180a. Similarly, the second platen 122 carries a second forming assembly 160b. The first and second platens 120 and 122 move along the guide rails 108 ($A_1$, and $A_2$) to move the first and second forming assemblies 160a and 160b between an engaged position and a disengaged position. More particularly the first and second forming assemblies 160a and 160b are in the engaged position when they contact opposing sides of the web 101 (not shown in FIG. 2), and the first and second forming assemblies 160a and 160b are in the disengaged position when they are spaced apart from the web 101 (shown in FIG. 2). As described in more detail below, a platen drive assembly moves the first and second platens 120 and 122 along the guide rails 108.

In this particular embodiment, the platen drive assembly includes a plurality of drive shafts 130 rotatably connected to the cross members 104 of the primary frame 102, a first arm 132 connected to each end of each drive shaft 130, and a second link 134 connected to each first arm 132. The thermal press 100, for example, can have two lower drive shafts 130 extending between the lower cross members 104 and two upper drive shafts 130 extending between the two upper cross members 104. The drive shafts 130 are preferably coupled to the cross members 104 by bushings to allow the drive shafts 130 to rotate about their respective longitudinal axes. The drive shafts 130 are also coupled to a hydraulic motor or other type of actuator (now shown) by a separate linkage (not shown) to rotate the drive shafts 130.

The first arms 132 are attached to the drive shafts 130 at load areas P, which are preferably proximate to a cross member 104 of the frame 102. The load areas P are regions around the drive shafts 130 that are spaced inwardly toward the interior of the frame 102 with respect to the cross members 104. Each first arm 132 defines at least a portion of a first link that is securely attached to a drive shaft 130 to rotate with the drive shaft 130. For example, a first arm 132 can have a flat surface that engages a corresponding flat region 131 on a drive shaft 130. The second links 134 each have a proximal end or a first end 135 coupled to a corresponding first arm 132 and a distal end or a second end 136 coupled to either the first or second platen 120 or 122. Thus, as explained in greater detail below, rotation of the drive shafts 130 rotates the first arms 132 and the second links 134 to move the first and second platens 120 and 122 along the guide rails 108.

The thermal press 100 further includes a plurality of counter-force assemblies 140 at the ends of the drive shafts 130 to exert a counteracting force at each load area P along the drive shafts 130. In this embodiment, each counter-force assembly 140 includes a counteracting element 142 and a support element 144 that are configured to engage one another when the first and second forming assemblies 160a and 160b press against opposing sides of the web 101 in the engaged position.

Figure 4:
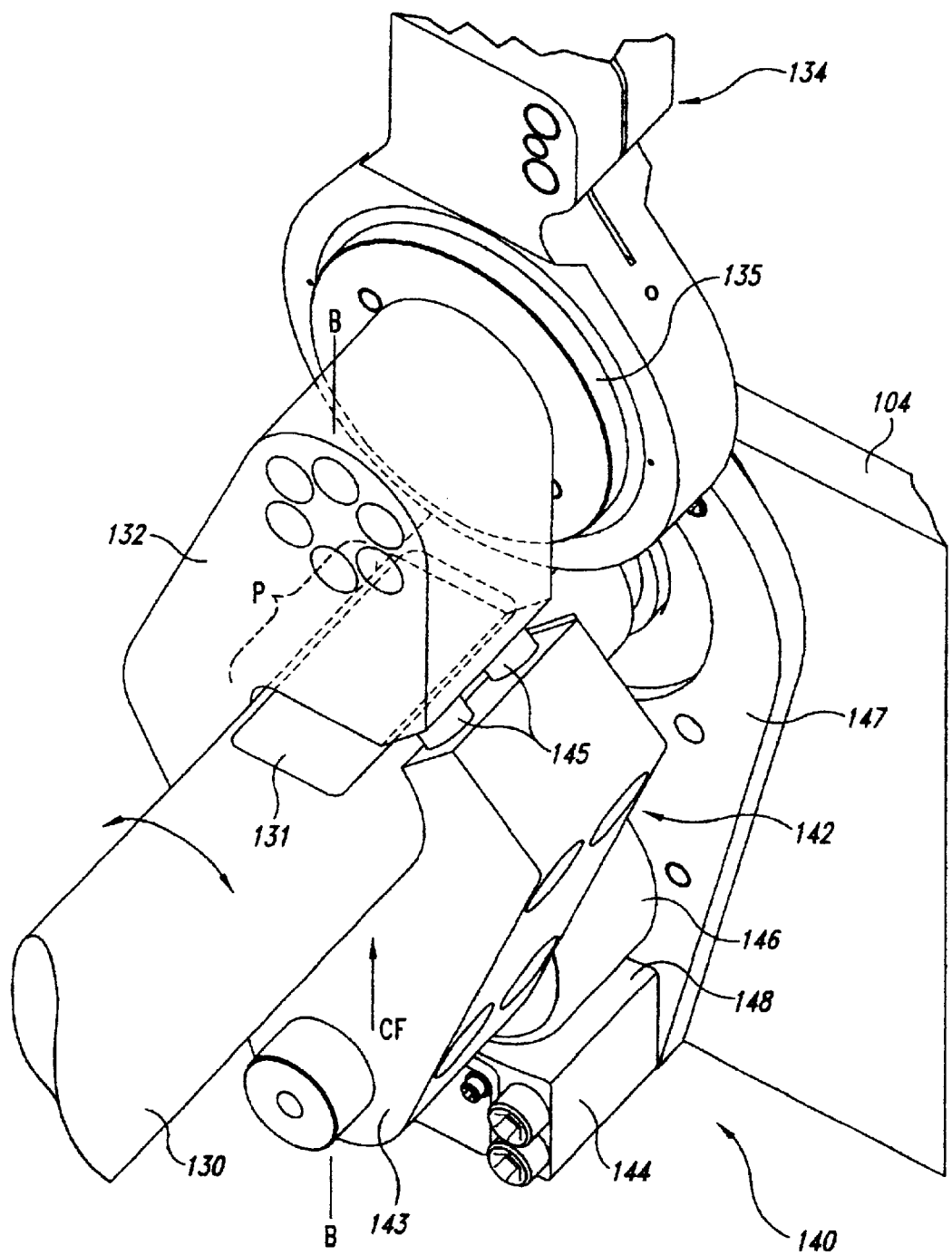
FIG. 4 is a top isometric view illustrating a portion of a platen drive assembly of the thermal press of FIG. 2 in greater detail.

Referring to FIG. 4, the counteracting element 142 can include a second arm 143 having a first section at one portion the load area P and a second section projecting from the drive shaft 130 in a direction away from a corresponding first arm 132. The second arm 143, more particularly, is preferably attached to the first arm 132 by a number of bolts 145. In this embodiment, the first arm 132 and the second arm 143 are separate components that together define the first link of the platen drive assembly. The first arm 132 and the second arm 143 may alternatively be integral with one another such that the first link is a single component. The counteracting member 142 also preferably includes a roller 146 attached to the second section of the second arm 143. Additionally, the first arm 132 and the second arm 143 preferably project outwardly from the drive shaft 130 along diametrically opposed axes such that the roller 146, the drive shaft 130, and the rotational axis of the first end 135 of the second link 134 are aligned with one another along a common axis B—B of the first link.

In the embodiment of the counter-force assembly 100 shown in FIGS. 2–4, the support element 144 is a flange or block that projects inwardly from an attachment plate 147 attached to the cross member of 104 of the frame 102. The support element 144, more particularly, is preferably positioned so that the roller 146 engages a support surface 148 just as the first arm 132 and the second link 134 extend to a maximum stroke length in which the second link 134 is aligned with the common axis B—B of the first link. Thus, as the roller 146 engages the support element 144, the counter-force assembly 140 exerts a counteracting force against the drive shaft 130 and/or the first arm 132 to support the drive shaft 130 at the load area P.

Figure 5A:
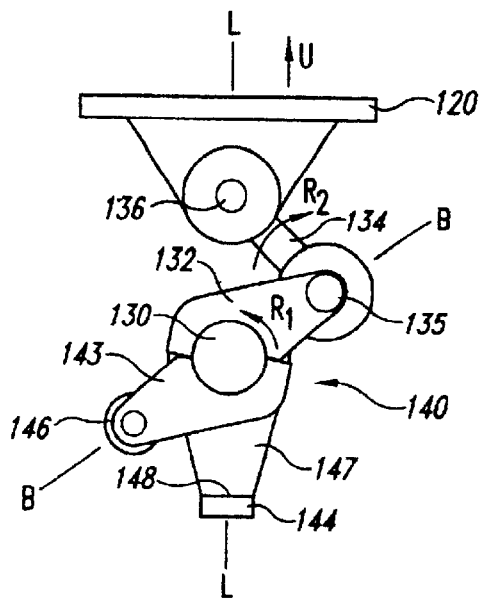
FIG. 5A is a schematic side elevation view illustrating one aspect of operating the thermal press of FIG. 2.
Figure 5B:
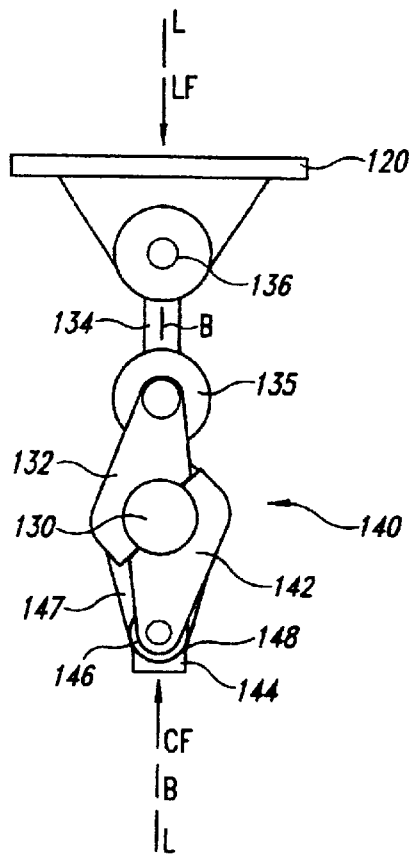
FIG. 5B is a schematic side elevation view illustrating another aspect of operating the thermal press of FIG. 2.

FIGS. 5A and 5B further illustrate the operation of one of the counter-force assemblies 140 shown in FIGS. 2–4. FIG. 5A, more particularly, illustrates the counter-force assembly 140 when the platen 120 is lowered to place the first forming assembly 160a (FIG. 2) in the disengaged position. At this point, the roller 146 of the counteracting element 142 is disengaged from the support surface 148 of the support element 144. The drive shaft 130 accordingly supports the weight of the platen 120 and the first forming assembly 160a at the load areas P without assistance from the counter-force assembly 140 in the disengaged position. The drive shaft 130 then rotates in a first rotational direction which pivots the first arm 132 in the first rotational direction $R_1$ and the second link 134 in a second rotational direction $R_2$ until the first arm 132 and the second link 134 are aligned at their maximum stroke length. The rotation of the drive shaft 130 in the first rotational direction $R_1$ accordingly moves the first platen 120 upward (U) to move the first forming assembly 160a into the engaged position.

FIG. 5B illustrates the counter-force assembly 140 after the platen 120 is raised to place the first forming assembly 160a (FIG. 2) in the engaged position. At this point, the common axis B—B of the first arm 132 and the second arm 143 is aligned with both the central axis of the second link 134 and a load axis L—L at the maximum stroke length of the first arm 132 and the second link 134. A load force LF is generated by pressing the first and second forming assemblies 160a and 160b (FIG. 2) against the web 101 (FIG. 2). The load force LF is transmitted along the load axis L—L to the drive shaft 130 via the second link 134 and the first arm 132. The roller 146 accordingly engages the support element 144 to exert a counteracting force CF against the drive shaft 130 and/or the first arm 132 via the second arm 142. In this embodiment, therefore, the counter-force assembly 140 provides a counter force CF at the load area P that offsets at least a significant portion of the load force IF to inhibit or prevent the drive shaft 130 from deflecting under the load force LF. The primary advantages of inhibiting such deflection of the drive shaft are explained in more detail below after describing the structure and operation of the first and second forming assemblies 160a and 160b.

Referring again to FIG. 2, when the first and second forming assemblies 160a and 160b are in the engaged position, the first and second forming assemblies 160a and 160b shape portions of the web 101 to form a plurality of finished articles. In this embodiment, the first forming assembly 160a has a plurality of first forming members 162a attached to a moveable plate 164a. The first forming members 162a, for example, can be male members or plugs. The second forming assembly 160b includes a plurality of second forming members 162b, such as female members or dies. Each of second forming members 162b is preferably coupled to a vacuum source to draw a vacuum in each of the second forming members 162b. Each first forming member 162a is preferably configured to be received in a corresponding second forming member 162b to shape a portion of the web 101 into a finished article.

The first and second forming assemblies 160a and 160b also include a first press plate 166a and a second press plate 166b, respectively. The first press plate 166a has a plurality of openings 167a aligned with the first forming members 162a, and the first press plate 166a has a first press surface 168a with a raised lip 169a around each of the openings 167a. The second press plate 166b has a plurality of openings 167b aligned with the second forming members 162b, and the second press plate 166b has a second press surface 168b. The moveable plate 164a is independently driven by the final-drive assembly 180 to move the first forming members 162a along travel a path ($C_1$) through the openings 167a and 167b.

The final-drive assembly 180 includes a bracket 181 attached to the first platen 120, a final-drive motor 182 attached to the bracket 181, and a threaded drive shaft 184 engaged with a nut 186. The drive shaft 184 is preferably a ball screw such that rotation of the drive shaft 184 moves the nut 186 in the direction of the longitudinal axis of the drive shaft 184. The final-drive assembly 180 also includes a plate 187 attached to the nut 186 and a plurality of posts 188 extending between the plate 187 and the moveable plate 164a. In operation, the final-drive motor 182 rotates the drive shaft 184 to move the nut 186 along the drive shaft 184 (D). The nut 186 accordingly moves the plate 187 and the posts 188 to move the moveable plate 164a and the first forming members 162a along the travel path $C_1$. In another embodiment, the second forming members 162b can be mounted to a second moveable plate that is coupled to another final drive assembly attached to the second platen to move the second forming members 162b along a travel path $C_2$.

To form a plurality of finished articles from the web 101, the drive shafts 130 rotate to move the first and second forming assemblies 160a and 160b into the engaged position in which the first and second press plates 166a and 166b press against opposing sides of the web 101. The raised lips 169a on the first press plate 166a cut the web 101 to separate the finished articles from the web 101, and the raised lips 169a and the surface 168b of the second press plate 166b together form a rim around the finished article. As described above, the counter-force assembly 140 exerts the counter force CF against the drive shafts 130 to oppose the load force LF exerted by the press plates 166a and 166b. The final-drive assembly 180 then drives the first forming members 162a into the web 101 until the first forming members 162a are received in the second forming members 162b. A vacuum may also be drawn in each of the second forming members 162b and pressurized "form air" may be blown through the first forming members 162a to enhance the conformality of the web 101 to the surface of the second forming members 162b. After the first forming members 162a are received in the second forming members 162b, the final-drive assembly 180 draws the first forming members 162a apart from the second forming members 162b. The platen drive motor then rotates the drive shafts 130 in an opposite direction to move the first and second forming assemblies 160a and 160b into the disengaged position.

The embodiment of the thermal press 100 shown in FIGS. 2–5B is expected to accurately form rims on the finished articles. One aspect of the embodiment of the thermal press 100 is that the present inventors recognized that conventional thermal presses may not accurately form the rims on the finished articles because the drive shafts deflect under the load force when the first and second forming assemblies press against the web in the engaged position and the form air blows against the web. Such deflection of the drive shafts in conventional thermal presses reduces the pressure exerted by the first and second press plates 166a and 166b against the web 101 to the extent that there is insufficient force to form the rim between the raised lips 169a and the press surface 168b of the second press plate 166b. In the thermal press 100. however, the counter-force assemblies 140 provide counteracting forces at the load areas P on the drive shafts 130 that reduce or eliminate deflection of the drive shafts 130. Because the counter-force assemblies 140 reduce deflection of the drive shafts 130, the thermal press 100 provides sufficient pressure against the web 101 to consistently form accurate rims on the finished articles.

The thermal press 100 is also expected to enhance the control of the wall thickness of the finished articles because it reduces vacuum leaks in the second forming members 162b as the first and second forming members 162a and 162b shape portions of the web 101. The counter-force assembly 140 generally increases the pressure applied to the web 101 by the first and second press plates 166a and 166b because the second arms 143 and the support elements 144 reduce deflection of the drive shafts 130. As a result, the rims of the finished articles are able to seal against the first and second press plates 166a and 166b as the first and second forming members 162a and 162b shape portions of the web 101. The counter-force assemblies 140, therefore, reduce variances in the wall thickness of the finished articles caused by vacuum leaks in the second forming member 162b.

Figure 6:
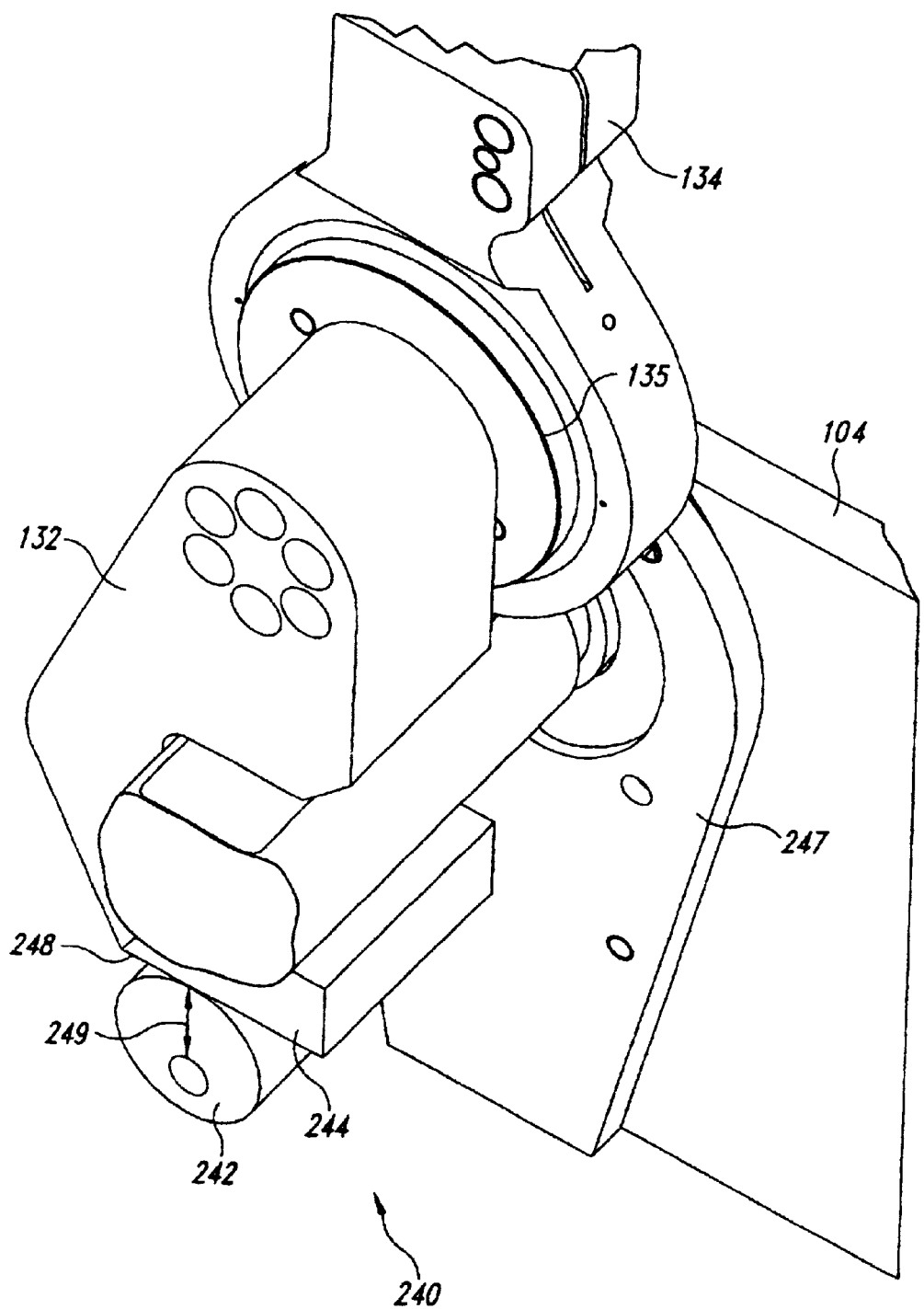
FIG. 6 is a top isometric view illustrating another platen drive assembly in another thermal press in accordance with another embodiment of the invention.
Figure 7:
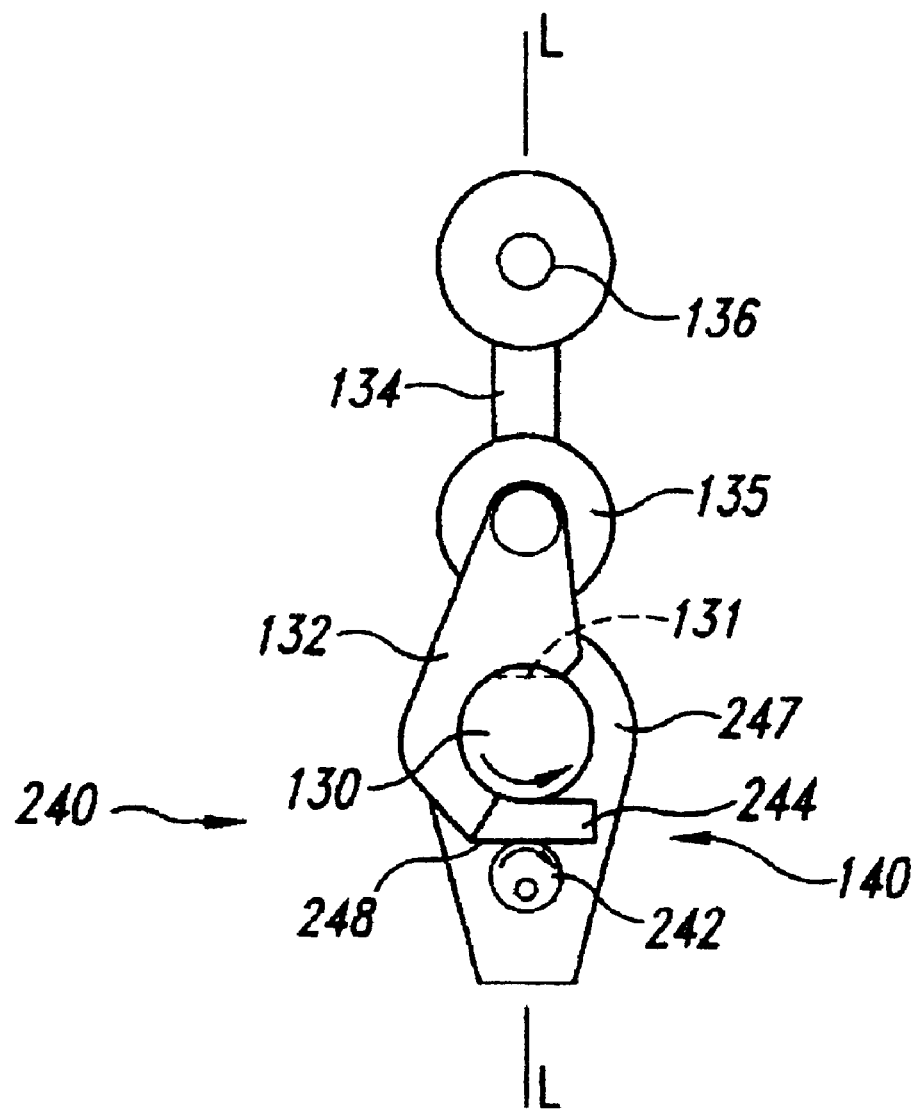
FIG. 7 is a schematic side elevation view illustrating one aspect of operating the thermal press of FIG. 6.

FIGS. 6 and 7 illustrate an embodiment of a counter-force assembly 240 in accordance with another embodiment of the invention. In this embodiment, the counter-force assembly 240 includes a counteracting element 242 attached to the frame 140 by a plate 247, and a support element 244 attached to first arm 132 and/or the drive shaft 130. The counteracting element 242 can be a cam or a second arm rotationally attached to the frame 140 to rotate in coordination with the drive shaft 130. In the particular embodiment shown in FIGS. 6 and 7, the counteracting element 242 is a cam having a major dimension 249 configured to engage a support surface 248 on the bottom of the support element 244 when the first arm 132 and the major dimension 249 of the cam are aligned with the load axis L—L. The counteracting element 242 may alternatively act directly against the drive shaft 130 such that the support surface is a portion of the surface of the drive shaft 130 in the load area. The counteracting element 242 accordingly exerts a counter-force at the load area on the drive shaft 130 when the first forming assembly 160a (FIG 2) is in the engaged position to reduce or prevent the deflection of the drive shaft 130.

From the foregoing it will be appreciated that, although specific embodiments of the invention have been described herein for purposes of illustration, various modifications may be made without deviating from the spirit and scope of the invention. For example, referring to FIGS. 2–4, the support element 144 can be positioned such that the roller 146 engages the support surface 148 after the drive shaft 130 deflects by a small amount to control the pressure applied to the web 101 by the first and second press plates 166a and 166b. The deflection of the drive shaft 130 is generally limited to approximately 0.0625 inch. Additionally, instead of cutting the finished articles from the web using the raised lips 169a, the raised lips can be used only to form the rims and the finished articles can then be trimmed from the web downstream from the thermal press. Accordingly, the invention is not limited except by the appended claims.

What is claimed is:

1. In a press for forming a finished article from a web of thermoplastic material, a method of forming a finished article comprising:

rotating a drive shaft to move a first forming assembly into an engaged position in which the first forming assembly presses a web of thermoplastic material against a second forming assembly, the first forming assembly exerting a load force against the drive shaft at a load area;

exerting a counteracting force against the drive shaft at the load area by engaging a counteracting element coupled to the drive shaft with a support surface spaced apart from the drive shaft by a fixed distance as the first forming assembly moves into the engaged position, to oppose the load force when the first forming assembly is in the engaged position; and shaping a portion of the web between a first forming member of the first forming assembly and a second forming member of the second forming assembly.

2. The method of claim 1 wherein:

a first arm projects from the drive shaft at the load area, the first arm being connected to the drive shaft to rotate with the drive shaft and the first arm being pivotally connected to a second link, and the second link being pivotally attached to the first forming assembly, wherein rotation of the drive shaft pivots the first arm and the second link to move the first forming assembly between the engaged position and a disengaged position;

the counter acting element comprises a second arm having a first section coupled to at least one of the drive shaft at the load area and the first arm to rotate with the drive shaft and a second section projecting from the drive shaft opposite from the first arm, the first and second arms together defining a first link;

the support surface comprises a support element aligned with the second section of the second arm and spaced apart from the drive shaft to engage the second section of the second arm and exert the counteracting force through the second arm as the first forming assembly enters the engaged position; and engaging the counteracting element with the support surface comprises rotating the drive shaft to rotate the second section of the second arm into engagement with the support surface as the first arm drives the first forming assembly into the engaged position.

3. The method of claim 1 wherein:

a first arm projects from the drive shaft at the load area, the first arm being connected to the drive shaft to rotate with the drive shaft and the first arm being pivotally connected to a second link, and the second link being pivotally attached to the first forming assembly, wherein rotation of the drive shaft pivots the first arm and the second link to move the first forming assembly between the engaged position and a disengaged position;

the counter acting element comprises a cam coupled to the first arm to rotate with the drive shaft, the cam having a major dimension;

the support surface comprises a support element aligned with the cam and spaced apart from the drive shaft to engage the major dimension of the cam and exert the counteracting force through the cam as the first forming assembly enters the engaged position; and engaging the counteracting element with the support surface comprises rotating the drive shaft to rotate the major dimension of the cam into engagement with the support surface as the first arm drives the first forming assembly into the engaged position.

4. The method of claim 1 wherein:

a first arm projects from the drive shaft at the load area, the first arm being connected to the drive shaft to rotate with the drive shaft and the first and being pivotally connected to a second link, and the second link being pivotally attached to the first forming assembly, wherein rotation of the drive shaft pivots the first arm and the second link to move the first forming assembly between the engaged position and a disengaged position;

the counter acting element comprises a rotatable second arm separate from the drive shaft and separate from the first arm, the second and being rotatable in coordination with the rotation of the drive shaft;

the support surface comprises a surface either coupled to the drive shaft or on the drive shaft at the load area;

and engaging the counteracting element with the support surface comprises rotating the drive shaft and rotating the second arm to engage the second arm with the support surface as the first arm drives the first forming assembly into the engaged position.

* * * * *